US012391858B2

(12) United States Patent
Palomo Del Barrio et al.

(10) Patent No.: US 12,391,858 B2
(45) Date of Patent: Aug. 19, 2025

(54) COMPOSITE PHASE-CHANGE MATERIALS WITH ACTIVE SUPPORTING MEDIA FOR THERMAL ENERGY STORAGE APPLICATIONS (71) Applicant: FUNDACIÓN CENTRO DE INVESTIGACIÓN COOPERATIVA DE ENERGÍAS ALTERNATIVAS CIC ENERGIGUNE FUNDAZIOA, Álava (ES)

(72) Inventors: Elena Palomo Del Barrio, Álava (ES); Jean-Luc Dauvergne, Álava (ES); Ángel Serrano Casero, Álava (ES); Stefania Doppiu, Álava (ES)

(73) Assignee: FUNDACIÓN CENTRO DE INVESTIGACIÓN COOPERATIVA DE ENERGÍAS ALTERNATIVAS CIC ENERGIGUNE FUNDAZIOA, Álava (ES)

( * ) Notice: Subject to any disclaimer, the term of this patent is extended or adjusted under 35 U.S.C. 154(b) by 836 days.

(21) Appl. No.: 17/597,297

(22) PCT Filed: Jul. 3, 2020

(86) PCT No.: PCT/EP2020/068819
§ 371 (c)(1),
(2) Date: Dec. 30, 2021

(87) PCT Pub. No.: WO2021/004936
PCT Pub. Date: Jan. 14, 2021

(65) Prior Publication Data
US 2022/0315822 A1 Oct. 6, 2022

(30) Foreign Application Priority Data
Jul. 5, 2019 (EP) .................................... 19382574

(51) Int. Cl.
C09K 5/02 (2006.01)
C09K 5/06 (2006.01)

(52) U.S. Cl.
CPC ................ *C09K 5/063* (2013.01); *C09K 5/02* (2013.01); *Y02E 60/14* (2013.01)

(58) Field of Classification Search
CPC ... C09K 5/00; C09K 5/02; C09K 5/06; C09K 5/063; B01J 13/02; B01J 13/025;
(Continued)

(56) References Cited

U.S. PATENT DOCUMENTS 6,447,692 B1 * 9/2002 Momoda .................. C09K 5/10
252/75
8,937,384 B2 * 1/2015 Bao ........................ H01L 23/427
257/714
(Continued)

FOREIGN PATENT DOCUMENTS

CN 103224601 A 7/2013
CN 104531080 A 4/2015
(Continued)

OTHER PUBLICATIONS

Jankowski et al. ("A review of phase change material for vehicle component thermal buffering," Applied Energy, 113, 1525-1561, 2014) (Year: 2014).*
(Continued)

Primary Examiner — Matthew R Diaz
(74) Attorney, Agent, or Firm — Knobbe, Martens, Olson & Bear, LLP (57) ABSTRACT A composite phase-change material (PCM) has a non-polymeric solid-solid PCM and a solid-liquid PCM. The solid-liquid PCM occupies an internal volume of the solid-solid PCM. The composite material takes full advantage of the latent heat of both PCMs, while avoiding seepage of the
(Continued)

inner solid-liquid PCM. A method is for the preparation of the composite PCM. A thermal energy storage device includes the composite PCM.

18 Claims, 5 Drawing Sheets

(58) Field of Classification Search
CPC . B01J 13/04; B01J 13/043; B01J 13/20; B01J 13/206; Y02E 60/14
See application file for complete search history.

(56) References Cited

U.S. PATENT DOCUMENTS

| | | | |
|---|---|---|---|
| 2015/0197678 A1* | 7/2015 | Han | C09K 5/063 264/129 |
| 2018/0068926 A1* | 3/2018 | Krajniak | H01L 23/427 |

FOREIGN PATENT DOCUMENTS

| | | | | |
|---|---|---|---|---|
| CN | 106281235 A | * | 1/2017 | C09K 5/063 |
| CN | 107779173 A | * | 3/2018 | |
| CN | 108300421 A | | 7/2018 | |
| TW | 1411464 B | * | 10/2013 | |
| WO | WO-2017173176 A1 | * | 10/2017 | |

OTHER PUBLICATIONS

Chen, K., Yu, X., Tian, C. and Wang, J., *Preparation and characterization of form-stable paraffin/polyurethane composites as phase-change materials for thermal energy storage*, Energy Conversion and Management, 77, 13-21, 2014.

Khadiran, T., Hussein, M.Z., Zainal, Z. and Rusli, R., *Encapsulation techniques for organic phase-change materials as thermal energy storage medium: A review*. Solar Energy Materials and Solar Cells, 143, 78-98, 2015.

International Search Report mailed Oct. 12, 2020 in International Application No. PCT/EP2020/068819.

Jankowski, N.R. and McCluskey, E.P., *A review of phase change materials for vehicle component thermal buffering*. Applied Energy, 113, 1525-1561, 2014.

Sarier, N. and Onder, E., *Organic phase-change materials and their textile applications: An overview.* Thermochimica Acta, 540, 7-60, 2012.

Sundararajan, S., et al., *Versatility of polyethylene glycol (PEG) in designing solid-solid phase change materials for thermal management and their application to innovative technology*, Journal of Materials Chemistry A, 5, 18379-18396, 2017.

Umair Malik Muhammad et al., *Novel strategies and supporting materials applied to shape-stabilize organic phase change materials for thermal energy storage—A review*, Applied Energy, 235, 846-873, 2019.

Ventola, L., et al., *Molecular alloys as phase change materials for energy storage and thermal protection at temperatures from 70 to 85° C.*, J. Phys. Chem. Solids, 66, 1668-1674, 2005.

Written Opinion mailed Oct. 12, 2020 in International Application No. PCT/EP2020/068819.

Sari, A., et al., Development, Characterization, and Latent Heat Thermal Energy Storage Properties of Neopentyl Glycol-Fatty Acid Esters as New Solid-Liquid PCMs, Ind. Eng. Chem. Res. 52, 18269-18275, 2013; dx.doi.org/10.1021/ie403039n.

* cited by examiner

COMPOSITE PHASE-CHANGE MATERIALS WITH ACTIVE SUPPORTING MEDIA FOR THERMAL ENERGY STORAGE APPLICATIONS

PRIORITY AND CROSS REFERENCE TO RELATED APPLICATIONS

This application is the U.S. National Stage Application under 35 U.S.C. § 371 of International Application No. PCT/EP2020/068819, filed Jul. 3, 2020, designating the U.S. and published in English as WO 2021/004936 A1 on Jan. 14, 2021, which claims the benefit of European Application No. EP 19382574.2, filed Jul. 5, 2019. Any and all applications for which a foreign or a domestic priority is claimed is/are identified in the Application Data Sheet filed herewith and is/are hereby incorporated by reference in their entirety under 37 C.F.R. § 1.57.

FIELD OF THE INVENTION

This invention relates to the field of thermal energy storage, more precisely to the field of latent heat energy storage of phase-change composite materials. The materials of the invention comprise a non-polymeric solid-solid PCM and a solid-liquid PCM.

BACKGROUND

Thermal energy storage (TES) technologies are valuable components in many energy systems and could be an important tool in achieving a low-carbon future. According to the storage principle, TES technologies can be divided into three categories: sensible heat storage, latent heat storage and thermochemical heat storage. Sensible heat storages are the most commonly deployed type of TES. However, latent heat storage technologies based on Phase-Change Materials (PCMs) are particularly attractive for applications where thermal energy has to be stored or delivered over a narrow temperature range or when compactness is a requirement. Indeed, PCMs are capable of absorbing or releasing great amounts of energy in the form of latent heat during phase transitions at nearly constant temperature. They enable compact TES systems with volumetric storage capacity five to ten times greater than that of sensible heat storage systems.

Most widely used PCMs undergo solid-liquid transitions (solid-liquid PCM) although several PCM families displaying solid-solid transitions (solid-solid PCM) have also been disclosed. Compared to solid-solid PCMs, solid-liquid PCMs are preferred due to higher latent heat. However, solid-liquid PCMs require encapsulation in order to avoid leakage of the liquid phase at temperatures above the melting point and, therefore, solid-liquid PCMs are less versatile regarding storage system concepts and routes for heat transfer enhancement.

Composite PCM refers to a class of materials composed of a supporting material which encloses the PCM, examples being micro-encapsulated PCMs and the so-called shape-stabilized PCMs.

Micro-encapsulation is the process of coating individual particles or droplets with a film to produce capsules at micrometer to milliliter size (<1000 mm), known as a microcapsules, microparticles or microspheres. Capsules at nanometer in size (<1000 nm) are known as nanocapsules, nanoparticles or nano-spheres. These capsules are composed of two main parts: the core comprising a solid-liquid PCM and a shell comprising a polymer, inorganic or hybrid material. The shell will act as a container to protect the inner core PCMs from the external environment and to avoid leakage of the PCM when in liquid phase. Micro- or nano-capsules exist in several shapes such as spherical, tubular, oval or irregular shape (Khadiran, T., Hussein, M. Z., Zainal, Z. and Rusli, R., *Encapsulation techniques for organic phase-change materials as thermal energy storage medium: A review. Solar Energy Materials and Solar Cells,* 2015, 143, 78-98; Sarier, N. and Onder, E., *Organic phase-change materials and their textile applications: An overview. Thermochimica Acta,* 2012, 540, 7-60). Micro-encapsulated PCMs yield encapsulation efficiency values from 60 to 90% and PCM-shell mass proportion of up to 80%.

Shape-stabilized phase-change materials (SPCMs), also referred to as form-stable PCMs, can be defined as a class of solid-liquid PCMs which maintain their original shape even when the temperature of the PCM is over the melting point (liquid state). SPCMs can be classified into two major groups depending on the nature of the supporting material: i) SPCM with supporting polymer-based organic materials, obtained by blending and characterized by a continuous polymeric matrix that encloses the PCM; and ii) SPCM with supporting inorganic porous materials that are produced by incorporating a liquid PCM into the porous structure of the supporting material by vacuum assisted infiltration method or by the sol-gel method. PCMs encapsulated into porous structures do not suffer leakage due to capillary forces and/or hydrogen bonding. SPCMs yield PCM-supporting material mass proportion values ranging from 35 to 95%.

PCM composite materials as the ones described above have the advantage of containment of the liquid phase. However, this is achieved at the cost of significant loss of energy density (minimum of 20%, often more). This is due to the volume occupied by the encapsulating/supporting material which does not contribute to latent heat storage. Chen et al. discloses shape-stabilized solid-liquid PCM composites in which a polyurethane polymer (PU) encloses a paraffin wax or an alkane(Chen, K., Yu, X., Tian, C. and Wang, J., Preparation and characterization of form-stable paraffin/polyurethane composites as phase-change materials for thermal energy storage, *Energy Conversion and Management,* 2014, 77, 13-21). The main purpose of the work disclosed by Chen et al. is not to avoid the above-mentioned leakage drawbacks of solid-liquid PCMs but to reduce the cost of the supporting material by using polyurethane (PU). However, the high cost and complex processing of PU-PCMs makes this material of low interest in terms of industrial application.

Therefore, a need still exists to improve existing solutions and provide more efficient latent heat storage technologies based on Phase-Change Materials.

SUMMARY OF THE INVENTION

The authors of the present invention have found that the above mentioned limitations of solid-liquid PCM leakage and energy density can be surprisingly solved by selecting a non-polymeric solid-solid PCM as the enclosing/supporting material.

To the best knowledge of the inventors, no such composite PCM had ever been disclosed before. Therefore, the invention disclosed herein and defined in the claims relates to composite PCMs in which a non-polymeric solid-solid PCM encloses or encapsulates a solid-liquid PCM. It differs from previous works in the fact that the outer enclosing/supporting material is a non-polymeric solid-solid PCM, leading to major new features and advantages as described in the present disclosure. This material takes full advantage of the latent heat of both PCMs, while avoiding seepage of the inner solid-liquid PCM.

In a first aspect the invention provides a composite phase-change material comprising:
a) a non-polymeric solid-solid phase-change material; and
b) a solid-liquid phase-change material;
wherein the non-polymeric solid-solid phase-change material encloses the solid-liquid phase-change material.

In a second aspect, a method is provided for obtaining the composite material of the invention, wherein particles or droplets of the solid-liquid PCM are coated with the solid-solid PCM.

In a third aspect, the invention is directed to a method for preparing the composite PCM of the invention which comprises preparing a mixture comprising the solid-solid PCM and the solid-liquid PCM both in solid phase, heating the resulting mixture to a temperature higher than the melting point of the solid-liquid PCM, optionally pressing the resulting mixture, and cooling until solidification of the solid-liquid PCM.

In a fourth aspect, the invention is directed to a method for preparing the composite PCM of the invention which comprises preparing a heated mixture comprising the solid-solid PCM and the solid-liquid PCM both in liquid phase, and cooling until solidification of the solid-liquid PCM.

In a fifth aspect, a method is provided for obtaining the composite PCM of the invention, which comprises preparing a porous structure or matrix of the solid-solid PCM, infiltrating or impregnating said matrix with the solid-liquid PCM in liquid phase and cooling until solidification of the solid-liquid PCM.

In a sixth aspect, the invention is directed to the use of the composite PCM of the invention in Thermal Energy Storage (TES) applications.

In a seventh aspect, the invention is directed to a Thermal Energy Storage system comprising the composite PCM of the invention.

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

The inventors have surprisingly found that high storage capacity composite phase-change materials (PCM) can be obtained when a non-polymeric solid-solid PCM is used as shape-stabilizer, enclosing or supporting material of a solid-liquid PCM.

Therefore, in a first aspect, the invention provides a composite phase-change material comprising:
a) a non-polymeric solid-solid phase-change material; and
b) a solid-liquid phase-change material,
wherein the solid-solid PCM encloses the solid-liquid PCM.

Composite PCM of the Invention

In the context of the present invention, a phase-change material (PCM) is a material which undergoes a first-order phase transition of its state or of its microcrystalline structure. For example, in the case of a solid-liquid PCM, a phase transition is that of changing from the solid state to the liquid state or vice-versa (solidification-melting). In another example, in the case of a solid-solid PCM, a phase transition could be that of changing from a face centered cubic (FCC) to a monoclinic crystal structure. This phenomenon includes a change in the atomic structure, or moreover, on the state of aggregation, accompanied by a noticeable change on the thermodynamic functions such as the enthalpy or the entropy. In the application frame of this invention, the phase transition of the PCM is thermally activated. When the PCM reaches the phase transition temperature, its temperature remains constant during the phase transition since the external heat is no longer used to change the temperature of the PCM but to change the state or crystallographic structure of the material itself. As a consequence, the energy involved in the phase transition of the PCM, i.e., the specific enthalpy difference between both states of the PCM (at constant temperature) also known as latent heat, is absorbed or released on the melting-solidification or crystalline structure change process of the PCM.

The composite PCM of the invention is shape-stabilized. This is so because the solid-solid PCM functions as support/encapsulating/enclosing material of the solid-liquid PCM and does not require any further compounds to stabilize the shape of composite PCM. In this context, stabilization refers to the fact that the composite PCM of the invention does not leek any solid-liquid PCM when this is in the liquid state, and the shape of the structure is maintained.

In the context of the present invention, reference to the solid-solid PCM encapsulating or enclosing the solid-liquid PCM includes any configuration where the solid-solid PCM is acting as supporting material for the solid-liquid PCM, i.e. where the solid-liquid PCM occupies an internal volume of the solid-solid PCM, so that no seepage occurs even when the temperature of the system is such that the solid-liquid PCM is in liquid state. The configuration of the composite PCM does not significantly affect the way the invention works, as long as the solid-solid PCM functions as shape-stabilizer or support of the solid-liquid PCM.

In this way, in one embodiment of the invention, the composite PCM is characterized by being in the form of a core-shell structure, such as capsules. In this case, the core comprises the solid-liquid PCM, in the form of particles or droplets, and the shell comprises the solid-solid PCM, preferably consists of it, in the form of a film that coats the particles or droplets of the core. The shape of the capsules can be spherical, tubular, oval, irregular or even combinations thereof. The capsules may also be in the form of single-core or multi-core. In the case of multi-core, a film of the solid-solid PCM coats at least two particles or droplets of the solid-liquid PCM that form the core.

In other embodiments, the composite PCM is characterized by being in the form of a matrix or agglomerate of particles or crystals of the solid-solid PCM where the pores of the matrix or the interstices between the particles/crystals are occupied by the solid-liquid PCM.

Any configuration where the solid-liquid PCM is integrated into, absorbed into, or any other way enclosed or retained by the solid-solid PCM is covered by the present invention.

This means that the solid-solid PCM is acting as support material, holding the solid-liquid PCM in its place when phase transitions occur, when the temperature of the system is such that the solid-liquid PCM is in liquid state.

In a preferred embodiment, the supporting structure consists in the non-polymeric solid-solid PCM. In a further embodiment, the composite PCM consists only of the solid-solid PCM and the solid-liquid PCM.

The present invention further contemplates a surface coating or layer that protects the composite PCM of the invention. In a particular embodiment, said coating or layer serves as additional protection against external environment conditions that could reduce the efficacy of the composite PCM.

In a particular embodiment, the composite PCM of the invention does not comprise cross-linking agents.

In the composite PCM of the invention, the solid-solid PCM is immiscible with the solid-liquid PCM. In this context, the term "immiscible" means that the solid-solid PCM and the solid-liquid PCM do not form a homogeneous mixture. Even if both materials are perfectly and uniformly blended, the material is characterized by domains only comprising solid-solid PCM, and domains only comprising solid-liquid PCM.

The solid-solid and solid-liquid PCMs are chemically compatible with each other. In the context of the present invention, "chemically compatible" means the absence of irreversible chemical reactions between the phase-change materials.

The composite PCM of the invention can be tailored to specific needs, because the temperature at which the phase change occurs can be tuned. This is preferably achieved by using more than one solid-solid PCM, and by tuning the relative amounts of each solid-solid PCM to achieve a target phase-change temperature of the resulting solid-solid PCM. This target phase-change temperature can advantageously be selected to coincide with or be close to that of a solid-liquid PCM.

More than one solid-liquid PCM can be also used. In this case, the phase change temperature can be tuned by controlling the relative amounts of each solid-liquid PCM. Alternatively, the amounts of both solid-solid PCM and/or solid-liquid PCM can be tuned. This is shown in the examples section below.

In a preferred embodiment, the PCMs are selected so that the difference between the phase-change temperature of the solid-solid PCM and the phase-change temperature of the solid-liquid PCM is less than 20° C., preferably less than 10° C., more preferably less than 5° C. In the case of the solid-liquid PCM, the phase-change can be a melting (or solidification) range, in which case the whole melting (or solidification) range of the solid-liquid PCM is preferably within the whole phase-change temperature range of the solid-solid PCM. In the context of the present invention, unless stated otherwise, the term "phase-change of the solid-solid PCM" is to be interpreted as a phase-change in the solid state and not a phase-change from solid to liquid.

In a preferred embodiment, the total latent heat of phase transition of the composite PCM is above 100 J/g, preferably above 140 J/g, more preferably above 180 J/g, even more preferably above 200 J/g.

The temperature at which the phase-change occurs and its total latent heat can be measured by means of DSC.

In a preferred embodiment, the PCMs are selected so that the difference between the phase-change temperature of the solid-solid phase-change material and the phase-change temperature of the solid-liquid PCM is less than 10° C. and so that the total latent heat of phase transition of the composite PCM is above 140 J/g.

In the context of the method of the invention, a composite PCM comprising "a solid-solid PCM" and "a solid-liquid PCM", includes a composite PCM comprising "at least one solid-solid PCM" and "at least one solid-liquid PCM". In an embodiment, "a solid-solid PCM" refers to either a unary, binary or ternary homogeneous mixture of solid-solid PCMs. Similarly, "a solid-liquid PCM" can refer to a unary, binary or ternary homogeneous mixture of solid-liquid PCMs.

In a particular embodiment, the composite PCM of the invention comprises at least 20% of the solid-solid PCM, preferably between 30% and 90%, and at least 10% of the solid-liquid PCM, preferably between 10% and 70%, by weight percent with respect to the total weight of the solid-solid and solid-liquid PCMs. In a further embodiment, said weight percent rations are with respect to the total weight of the composite PCM.

In another embodiment, the composite PCM of the invention comprises at least 30% of the solid-solid PCM, preferably between 40% and 80%; and/or at least 20% of the solid-liquid PCM, preferably between 20% and 70%, by weight percent with regards to the total weight of the solid-solid and solid-liquid PCMs. In a further embodiment, said weight percent rations are with respect to the total weight of the composite PCM.

The skilled person readily understands that, when the composite PCM of the invention is defined by the weight percentage values of the PCMs it comprises, these values can never sum up to a value which is greater than 100%.

In a particular embodiment, the composite PCM comprises:
a) a solid-solid PCM selected from alcohol and amine derivatives of 2,2-dimethylpropane (Neopentane, $C(CH_3)_4$) and mixtures thereof; and
b) a solid-liquid PCM selected from alkanes or paraffin waxes, metal salts, polyethylene glycols, carboxylic acids, fatty acid esters, fatty alcohols, and mixtures thereof.

In a further embodiment, the composite PCM comprises:
a) a solid-solid PCM selected from pentaerythritol (PE), pentaglycerine (Trimethylolethane, PG), neopentylglycol, 2-amino-2-methyl-1,3-propanediol (AMPL), tris (hydroxyl methyl)aminomethane (TAM) and mixtures thereof; and b) a solid-liquid PCM selected from linear n-alkanes such as Tetratetracontane or Docosane, metal salts including eutectic systems comprising chloride alkali metals and aluminum chloride, polyethylene glycols, carboxylic acids, fatty acid esters, fatty alcohols, and mixtures thereof; preferably Tetratetracontane, Docosane, and mixtures thereof.

The Non-Polymeric Solid-Solid PCM

In the present invention, the solid-solid PCM can be thought of as a "non-polymeric" compound, wherein the term "non-polymeric" is to be interpreted as a molecule that has no repeating monomers in its structure, preferably a molecule of molecular weight lower than 1500 g/mol, lower than 1000 g/mol, preferably lower than 500 g/mol.

In a particular embodiment, the solid-solid PCM is a molecule of molecular weight lower than 1500 g/mol. When more than one solid-solid phase-change materials is present, preferably each of said solid-solid phase-change materials must comply with the embodiments disclosed herein.

The molecular weight values disclosed in the description and defined in the claims are to be interpreted as being obtainable from size exclusion chromatography.

In a particular embodiment, the solid-solid PCM does not comprise cross-linking agents. In the invention, the solid-solid PCM is an active support consisting of a non-polymeric solid-solid PCM. The term "active support" serves to identify that the solid-solid PCM acts as a support for the solid-liquid PCM, which is enclosed by the solid-solid PCM as described throughout this description. The term "active" refers to the property of storing energy.

The skilled person in the art readily understands that a solid-solid PCM can also undergo melting or degradation if the temperature is high enough. However, in the present invention, the solid-solid PCM is selected so that it only undergoes solid-solid transitions within the working temperature ranges. In other words, the solid-solid PCM does not undergo solid-liquid transitions nor does it suffer thermal degradation within the temperature ranges it is intended to be worked at. Said temperature range will depend on the application, but typically ranges from 30 to 200° C.

This material is active in its whole structure, i.e., the entire molecule undergoes phase transition, and therefore the entirety of the enclosing support/encapsulating material of the composite PCM of the invention is an active solid-solid PCM. In detail, the entirety of the mass of the solid-solid PCM, which encloses the solid-liquid PCM, contributes to the latent heat of the composite and the entire structure of the solid-solid PCM comprises moieties that serve the purpose of undergoing phase transition. The solid-solid PCM of the invention is therefore considered a solid-solid PCM of the shelf, where the solid-solid PCM molecules do not result from structural modifications or physical entrapments that could render, for example, a solid-liquid PCM into a solid-solid PCM.

Any non-polymeric solid-solid PCM which undergoes solid-solid phase transitions should in principle be eligible for application in the composite PCM of the invention. Notwithstanding, the solid-solid PCM is preferably selected from those that have high transition enthalpies and have adjustable transition temperatures.

Other desirable properties of the solid-solid PCM are high values of heat capacity; high density; resistance to oxidation, preferably from container materials; non-toxicity; non-flammability; or low volumetric changes during phase transition.

In a preferred embodiment, the latent heat of phase transition of the solid-solid PCM is above 100 J/g, preferably above 150 J/g, more preferably above 200 J/g, and can be as high as 300 J/g. Preferably, it is comprised between 100 and 300 J/g.

On the one hand, the greater the transition enthalpy, the greater its thermal storage capacity. On the other hand, the possibility of tuning its transition temperature by choosing more than one solid-solid PCM allows choosing from a wider collection of solid-liquid PCMs with which they can be combined to obtain the composite PCM of the invention, capable of storing energy in a narrow range of temperatures. This is of particular interest for thermal energy storage devices.

In a preferred embodiment, the solid-solid PCM has a phase-change temperature comprised between 30 and 250° C., more preferably of between 40 and 200° C.

In a preferred embodiment, the solid-solid phase-change material does not comprise polyurethane.

Non-limiting exemplary solid-solid PCMs suitable for the present invention are:

Alcohols, including alcohol derivatives of 2,2-dimethylpropane (Neopentane, $C(CH_3)_4$), such as pentaerythritol (PE), pentaglycerine (also known as trimethylolethane, PG) and neopentylglycol (NPG);

Amino-compounds, including amine derivatives of 2,2-dimethylpropane and of alcohol derivatives thereof, such as 2-amino-2-methyl-1,3-propanediol (AMPL) and Tris(hydroxymethyl)aminomethane (TAM), Nitro-compounds, such as Nitroisobutylglycol (NMPD) and 1,3-Dinitro-1,3-diazacycloheptane, Nitro-aromatic compounds, such as octadecyl 2,4,6-trinitrobenzoate, Cyclic ether compounds, such as 1,4-dioxane, Anhydrides, such as cis-cyclohexane-1,2-dicarboxylic anhydride, Long-chain compounds, such as dihexadecylhydroxy arsine oxide, N,N,N-Trimethyl-1-hexadecanaminium chloride, undecanoic acid, tricosane, 1-Docosanol,4,4'-(1,3-Butadinyl-1,3-diyl)bis(4,1-phenylenedodecanoate),bis(dodecylammonium) tetrachloromanganate (II), lead(II) pentadecanoate, bis(hexadecylammonium) tetrachloroferrate(II), or bis(tetradecylammonium) tetrachlorozincate, Amide compounds, such as N,N'-Dibutylurea, Quaternary ammonium compounds, such as tetrapentylammonium thiocyanate, tetrapentylammonium nitrate or heptyltrihexylammonium iodide, Organometallic compounds, including alkylammonium compounds of general formula $(C_nH_{2n+1}NH_3)_2MX_4$, where M is a metal atom, X is a halogen atom and n is an integer from 1 to 17; and bis(dodecylammonium) tetrachloromanganate (II), lead(II) pentadecanoate, bis (hexadecylammonium) tetrachloroferrate(II), or bis (tetradecylammonium) tetrachlorozincate, and mixtures thereof.

In a preferred embodiment, the solid-solid PCMs are selected from alcohol and amine derivatives of 2,2-dimethylpropane (Neopentane, $C(CH_3)_4$) and mixtures thereof. Such compounds undergo solid-solid phase transitions from layered or chained low temperature structures (tetragonal, monoclinic, etc.) to high temperature homogeneous face centered cubic crystals (plastic phase).

Alcohol and amine derivatives of 2,2-dimethylpropane (Neopentane, $C(CH_3)_4$) refer to compounds resulting from the substitution of at least one hydrogen and/or methyl group in 2,2-dimethylpropane by OH and/or $NH_2$.

In an embodiment, the alcohol derivative of 2,2-dimethylpropane is a compound resulting from the substitution of at least one hydrogen, preferably at least two hydrogens, in 2,2-dimethylpropane by OH, such as pentaerythritol, pentaglycerine, neopentylglycol and mixtures thereof.

In an embodiment, the amine derivative of 2,2-dimethylpropane is a compound resulting from the substitution of one methyl group in 2,2-dimethylpropane or in an alcohol derivative of 2,2-dimethylpropane as defined above by $NH_2$, such as 2-amino-2-methyl -1,3-propanediol, tris(hydroxyl methyl)aminomethane and mixtures thereof.

Therefore, in a more preferred embodiment, the solid-solid PCM is selected from pentaerythritol, pentaglycerine, neopentylglycol, 2-amino-2-methyl-1,3-propanediol, tris(hydroxyl methyl)aminomethane and mixtures thereof. Preferably, the solid-solid PCM is selected from pentaerythritol, pentaglycerine, Neopentylglycol, and mixtures thereof.

The solid-solid phase transition in these organic compounds takes place at temperatures between 48° C. and 188° C. and is characterized by an unusually large enthalpy of transition, ranging from 110 J.g$^{-1}$ to 290 J.g$^{-1}$ (Sarier, N. and Onder, E., *Organic phase-change materials and their textile applications: An overview. Thermochimica Acta*, 2012, 540, 7-60). Moreover, binary and ternary mixtures of these compounds often allow obtaining new solid-solid PCMs with "tailor made" energy storage properties.

Therefore, in a particular embodiment, the solid-solid PCM is a unary, binary or ternary mixture of solid-solid PCMs. Advantageously, it is a binary mixture, since in this way the resulting material has an adjustable phase change temperature which depends, among others, on the ratio of each solid-solid PCM. This embodiment simplifies the purpose of providing an adjustable temperature PCM since by simply tuning the ratios of each solid-solid PCM, the temperature at which the final solid-solid PCM undergoes phase transition will vary.

Indeed, the isomorphism between the crystalline structures of some of the polyalcohols makes the existence of solid solutions possible at all proportions or over wide composition ranges.

In a particular embodiment, the composite PCM of the invention comprises at least 10%, at least 20%, at least 30%, at least 40%, at least 50%, at least 60%, at least 70%, at least 80%, or at least 90% of a solid-solid PCM, by weight percent with respect to the total weight of the solid-solid and solid-liquid PCMs. In another embodiment, the composite PCM of the invention comprises the above weight percent amounts of solid-solid PCM with respect to the total weight of the composite PCM.

In a preferred embodiment, the composite phase-change material of the invention comprises from 10% to 90%, from 20% to 90%, from 30% to 90%, from 35% to 85%, or from 40% to 80% of the solid-solid PCM, by weight percent with respect to the total weight of the solid-solid and solid-liquid PCMs. In another embodiment, the composite PCM of the invention comprises the above weight percent ratios of solid-solid PCM with respect to the total weight of the composite PCM.

In the context of the present invention, except stated otherwise, any number expressed in % is to be interpreted as a mass percentage value, calculated as the mass of the PCM divided by the total mass of all of the solid-solid and solid-liquid PCMs, or by the total mass of the composite PCM, as indicated, multiplied by 100. This would be equivalent to representing the value as wt%.

The Solid-Liquid PCM

In principle, any solid-liquid PCM can be selected for the composite PCM of the invention. Preferably, a solid-liquid PCM with a temperature range at which it undergoes phase transition that is close or within the temperature ranges of transition of the solid-solid PCM.

Other desirable properties of the solid-liquid PCM are high values of heat capacity; high density; resistance to oxidation, preferably from container materials; non-toxicity; non-flammability; or low volumetric change during phase transition.

In a preferred embodiment, the latent heat of melting of the solid-liquid PCM is above 60 J/g, preferably above 100 J/g, more preferably above 150 J/g, and can be as high as 300 J/g. Preferably, it is comprised between 100 and 300 J/g.

In another preferred embodiment, the solid-liquid PCM has a melting temperature comprised between −30 and 200° C., more preferably of between 40 and 200° C.

In the context of the present invention, alkanes, paraffin waxes, metal salts, polyethylene glycols, carboxylic acids, fatty acids, fatty acid esters, fatty alcohols, sugar, sugar alcohols and mixtures thereof, are preferred as solid-liquid PCMs.

Exemplary solid-liquid PCMs, suitable for the purposes of the present invention, include linear n-alkanes ($C_nH_{2n+2}$). The intermolecular forces holding n-alkane molecules together are van-der-Waals forces. Therefore, both the melting point and the latent heat of fusion increase progressively with the carbon chain length. Besides, many binary alkane systems make solid-state solutions with very narrow temperature windows (2-5° C.) between solidus and liquidus lines (Ventola, L., et al., *Molecular alloys as phase change materials for energy storage and thermal protection at temperatures from 70 to 85 ° C.*, J. Phys. Chem. Solids, 2005, 66, 1668-1674). This property allows a blend to be tailored to a particular melting range. Alkanes are preferably straight n-chain alkanes of formula $C_nH_{2n+2}$, preferably n being from 10 to 40, more preferably from 14 to 30, such as for example tetradecane, hexadecane, octadecane, eicosane, docosane, tetracosane, hexacosane, octacosane, or the like.

Metal salts are advantageously selected from anhydrous salts, including:
- Eutectic mixtures of alkali metal or alkaline earth metal chloride salts or transition metal chloride salts combined with aluminum salts, such as $CaCl_2$, KCl, LiCl, NaCl, $CoCl_2$ or $ZnCl_2$, combined with $AlCl_3$.
- Eutectic mixtures of alkali metal or alkaline earth metal chloride salts combined with iron salts, such as $CaCl_2$, LiCl, MgCl, combined with $FeCl_3$.
- Eutectic mixtures of alkali metal or alkaline earth metal chloride salts combined with zinc salts, such as KCl, NaCl, combined with $ZnCl_2$.
- Eutectic mixtures of alkali metal and alkaline earth metal nitrates, such as $LiNO_3$, $NaNO_3$ and $KNO_3$.
- Eutectic mixtures of alkaline hydroxides, such as KOH/LiOH, KOH/NaOH or LiOH/NaOH.
- Eutectic mixtures of $KAlCl_4/NaAlCl_4$, $LiAlCl_4/NaAlCl_4$, $LiCl/LiNO_3LiF/LiNO_3$.

Other exemplary solid-liquid PCMs, suitable for the purposes of the present invention, include polyethylene glycol ($HO-CH_2-(CH_2-O-CH_2)_n-CH_2-OH$). The melting temperatures and the latent heat values of these molecules increase gradually as the average molar weight (MW) of the PEG chains increase (Sundararajan, S., et al., *Versatility of polyethylene glycol (PEG) in designing solid-solid phase change materials for thermal management and their application to innovative technology*, Journal of Materials Chemistry A, 2017, 5, 18379-18396). Therefore, the melting point and heat capacity of a PEG system can be customized by selecting or mixing PEGs with different MWs. In an embodiment, polyethylene glycols having a molecular weight of from 600 to 20000, preferably from 600 to 6000 can be used.

Suitable fatty acids include, for example, capric acid, caprylic acid, lauric acid, myristic acid, palmitic acid, stearic acid and the like.

Fatty acid esters include alkyl (e.g. $C_1$-$C_{12}$ alkyl) esters of the above-mentioned fatty acids.

Suitable fatty alcohols include, for example, capric alcohol, lauryl alcohol, myristic alcohol, cetyl alcohol, stearyl alcohol and the like.

As shown in Table 1, these PCMs have melting points within the range of transition temperatures covered by the solid-solid PCMs identified above. They also have high latent heat. In addition, some of them allows easy tuning of their melting temperature, thus widening possibilities for combining with the solid-solid PCMs.

In a particular embodiment, the solid-liquid PCM is selected from alkanes or paraffin waxes, and mixtures thereof. Preferably, the solid-liquid PCM is selected from linear alkanes or paraffin waxes; more preferably from Tetratetracontane, and Docosane.

In a particular embodiment, the solid-liquid PCM is a unary, binary or a ternary mixture of solid-liquid PCMs. Preferably, it is a binary mixture.

TABLE 1

Melting temperature ranges and corresponding phase change latent heat per unit mass and per unit volume for exemplary solid-liquid organic PCMs.

| Solid-liquid PCMs | Melting temperature (° C.) | Latent heat of melting (J/g) | Latent heat of melting (MJ/m$^3$) |
| --- | --- | --- | --- |
| n-Alkanes | [−30, 115] | [102, 206] | [180, 375] |
| Paraffin waxes | [−10, 112] | [60, 269] | [57, 255] |
| Anhydrous salts | [−20, 120] | [100, 300] | [180, 680] |
| PEG | [−4, 70] | [118, 176] | [133, 255] |
| Fatty acids | [−7, 81] | [97, 259] | [83, 300] |
| Carboxylic acids | [8, 159] | [102, 260] | [180, 374] |

In another preferred embodiment, the composite PCM of the invention comprises at least 10%, at least 20%, at least 30%, at least 40%, at least 50%, at least 60%, at least 70%, at least 80%, or at least 90% of a solid-liquid PCM, by weight percent with respect to the total weight of the solid-solid and solid-liquid PCMs. In another embodiment, the composite PCM of the invention comprises the above weight percent amounts of solid-liquid PCM with respect to the total weight of the composite PCM.

In another preferred embodiment, the composite PCM of the invention comprises from 10% to 90%, from 10% to 80%, from 10% to 70%, from 20% to 70%, preferably between 30% and 70% of a solid-liquid PCM, by weight percent with respect to the total weight of the solid-solid and solid-liquid PCMs. In another embodiment, the composite PCM of the invention comprises the above weight percent ranges of solid-liquid PCM with respect to the total weight of the composite PCM.

In a most preferred embodiment, the composite phase-change material of the invention comprises no more than 70%, no more than 65% or no more than 60% of the solid-liquid PCM, by weight percent with regards to the total weight of the solid-solid and solid-liquid PCMs. In another embodiment, the composite PCM of the invention comprises no more than the above weight percent amounts of solid-liquid PCM with respect to the total weight of the composite PCM.

Method for the Preparation of the Composite PCM of the Invention

The composite material can be prepared by very simple and cost-effective procedures. In general, the method of the invention leads to a composite PCM comprising a non-polymeric solid-solid PCM and a solid-liquid PCM wherein the non-polymeric solid-solid phase-change material encloses the solid-liquid phase-change material.

This is so because the solid-solid PCM functions as support, or encapsulating or enclosing material of the solid-liquid PCM and does not require any further compounds to stabilize the shape of composite PCM. Any references to the solid-solid PCM's ability to support, encapsulate or enclose the solid-liquid PCM includes any configuration where no seepage occurs because the solid-liquid PCM is enclosed or adsorbed onto the internal surface of the structure formed by the solid-solid PCM (e.g., shell, agglomerate or matrix).

Without wishing to be bound by a particular theory, it is believed that the solid-liquid PCM adsorbs to the internal surface of the solid-solid PCM structure by capillarity forces. If the solid-solid PCM is in the form of a porous matrix, the solid-liquid PCM will occupy the pores of said matrix. If the solid-solid PCM is in the form of agglomerated particles or crystals, the solid-liquid PCM will occupy the interstices of said agglomerate. If the solid-solid PCM is in the form of a shell, the solid-liquid PCM will occupy the inner core of the shell.

In this way, the solid-solid PCM can be thought of as also acting as supporting material for the solid-liquid PCM, i.e. where the solid-liquid PCM is integrated into the solid-solid PCM and occupies an internal volume of the solid-solid PCM (in the case of capsules) or of the bulk of the solid-solid PCM (in the case of particle/crystal aggregates or porous matrixes), so that no seepage occurs even when the temperature of the system is such that the solid-liquid PCM is in liquid state. This means that the solid-solid PCM holds the solid-liquid PCM in its place when phase transitions occur, when the temperature of the system is such that the solid-liquid PCM is in liquid state. Alternatively, any configuration where the solid-liquid PCM is integrated into, absorbed into, or any other way enclosed or retained by the solid-solid PCM is covered by the present invention.

In a particular embodiment, the composite PCM of the invention can be prepared by a method comprising coating particles or droplets of the solid-liquid PCM with a film of the solid-solid PCM.

This method leads to capsules comprising a core with the solid-liquid PCM and a shell with the solid-solid PCM. The capsules can be spherical, tubular, oval, irregular or combinations thereof. They can also be mono-core or multi-core. The resulting capsules can be further coated with a non-PCM coating material.

Non-limiting examples of procedures that allow the production of these capsules are:

Dip-coating: which comprises dipping the solid-liquid PCM particles (cooled so that they are in the solid state) into the melted solid-solid PCM. The presence of the cooled particles leads to rapid deposition of a solidified layer of the solid-solid PCM around the particles of solid-liquid PCM. Alternatively, this method can comprise dipping the solid-liquid PCM particles into the solid-solid PCM in the presence of a solvent, followed by curing so that the solvent is removed.

Spray-drying: which comprises dissolving both solid-solid and solid-liquid PCMs in a solvent that allows maintaining them in liquid sate at a temperature below the melting point of the solid-solid PCM. The solution is then pumped under pressure through an atomizer, thus breaking up the liquid feed into a spray of fine droplets. Then, the droplets are ejected into a drying gas chamber where the solvent vaporization occurs, resulting in the formation of dry particles. Using an appropriate device, the dried particles can be separated from the drying medium, being then collected.

In an embodiment, the capsules or coated particles obtained have a diameter or an average diameter between 1 µm to 2 cm, or between 1 µm to 1 cm, or between 1 µm to 5 mm, or between 5 µm to 3 mm, or between 10 µm to 1 mm.

In another aspect, the method for preparing the composite PCM of the invention comprises preparing a mixture of the solid-solid PCM and the solid-liquid PCM (in their solid state), heating the resulting mixture to a temperature higher than the melting point of the solid-liquid PCM (but not of the solid-solid PCM), and cooling until solidification of the mixture.

In a particular embodiment, the solid-solid PCM is grinded before preparing the solid mixture of solid-solid PCM and solid-liquid PCM, in order to increase the surface area and so the increase of the contact with the solid-liquid PCM.

In a particular embodiment, this method comprises:
optionally, grinding the solid-solid PCM;
mixing the solid-liquid PCM and the optionally grinded solid-solid PCM in their solid states;
heating the mixture until the solid-liquid PCM becomes liquid (but below the melting point of the solid-solid PCM);
stirring the mixture until a well-mixed system is obtained, and
letting the temperature cool down below the phase-change temperature of the solid-liquid PCM so that the mixture solidifies.

The heating process can be carried out directly in a mold or the mixture can be heated in a different container and then injected into a mold, so that the cooling step occurs in the mold and so the composite PCM with the desired shape is obtained.

In a particular embodiment, the composite PCM is obtained in the form of pellets. Typical dimensions are from 1 mm to 20 cm.

This process results in an agglomerate of particles or crystals made of solid-solid PCM that act as a supporting structure that encloses the solid-liquid PCM which is held within the solid-solid PCM bulk by capillarity forces.

The material thus obtained, is a PCM composite wherein the solid-liquid PCM is integrated, retained to, or enclosed by the solid-solid PCM.

In a particular aspect, the method comprises an optional step of pressing the mixture prior to the step of cooling.

In a particular embodiment, the pressing step is performed at a pressure of from 1 to 1000 MPa, preferably 250 MPa.

In a particular embodiment, the composite PCM is obtained in the form of pellets. Typical dimensions are from 1 mm to 20 cm.

In another aspect, the method for preparing the composite PCM of the invention comprises preparing a mixture of the solid-solid PCM and the solid-liquid PCM (both in their liquid state), and cooling until solidification of the mixture.

In a particular embodiment, this method comprises:
heating both solid-solid PCM and solid-liquid PCM until both PCMs are in the liquid state;
mixing the solid-solid PCM and solid-liquid PCM in their liquid states;
stirring the mixture until a well-mixed dispersion is obtained, and
letting the temperature cool down below the phase-change temperature of the solid-liquid PCM so that the mixture solidifies.

The heating process can be carried out directly in a mold comprising both PCMs or the mixture can be heated in a different container and then injected into a mold, so that the cooling step occurs in the mold and so the composite PCM with the desired shape is obtained.

In a particular embodiment, the solid-solid PCM and the solid-liquid PCM are put in contact in their liquid states. In another embodiment, the solid-solid PCM and the solid-liquid PCM are first put in contact and only then heated until both are in the liquid states. In a particular embodiment, high speed mixing of both PCM in their liquid states is preferably desired, along with fast cooling of the uniform mixture. Optionally, a surfactant can be added to improve the uniformity of the dispersion.

In a particular embodiment, the composite PCM is obtained in the form of pellets. Typical dimensions are from 1 mm to 20 cm.

The method according to this particular aspect leads to a matrix of solid-solid PCM molecules bound by intermolecular forces which form a porous matrix that encloses the solid-liquid PCM. Preferably, the matrix is a continuous matrix.

The material thus obtained, is a PCM composite wherein the solid-liquid PCM is integrated, retained to, or enclosed by the solid-solid PCM.

In a further aspect, the invention refers to a process for preparing the composite PCM of the invention, which comprises preparing a porous matrix of the solid-solid PCM, infiltrating or impregnating said matrix with the solid-liquid PCM in liquid state, and cooling until solidification of the mixture.

The step of impregnating the solid-solid PCM matrix with the solid-liquid PCM can be performed by known techniques such as immersion of the solid-solid PCM in a liquid sample of the solid-liquid PCM, or vacuum impregnation, to name a few.

Methods known in the art for can be used for preparing the porous matrix of the solid-solid PCM, such as the sponge replica method. In this method, the solid-solid PCM is infiltrated, in liquid state, into a template, such as an organic crosslinked template. Once the temperature is reduced below its fusion point and the solid-solid PCM solidifies, the organic template is washed out by a solvent leaving the solid-solid PCM matrix structure. This method of infiltration or impregnation will once again keep the solid-liquid PCM from leakage due to capillary forces.

Except where stated otherwise, any of the above methods of the invention is preferably performed without any additional solvent, other than the PCMs used. The method of the invention is preferably performed under ambient air conditions, without any inert gas.

In a further embodiment, the invention is directed to a composite PCM obtainable by any of the processes disclosed herein.

Advantages of the Composite PCM of the Invention

Compared to composite PCMs known in the art, the composite PCMs of the present invention have enhanced heat capacity.

In addition to enhanced heat capacity, the transition temperature of the composite PCM of the invention can be easily customized over a wide range of temperatures. This technical effect is due to the fact that either the solid-solid PCM or the solid-liquid PCM or both, are mixtures forming solid-solid solutions (or solid-liquid solutions, or both) at all proportions or over a wide range of proportions, so that when changing the composition of the mixture, the transition temperature shifts. The solid-solid transition temperature of the supporting material can be tuned to overlap with that of the solid-liquid PCM as much as desired. For example, in the case of a PE/PG mixture with PE molar fraction of 0.3, a perfect match with the melting point of Tetratetracontane is achieved.

In addition to the above advantages, the present invention allows the provision of thermal energy storage within a poorly covered range of temperatures by current PCMs. The literature survey carried out by Jankowski and McCluskey covers more than 700 individual PCMs, including blends (Jankowski, N. R. and McCluskey, E. P., *A review of phase change materials for vehicle component thermal buffering*. Applied Energy, 2014, 113, 1525-1561). Over half of the disclosed materials have transition temperatures below 100° C., and only salts and metallic alloys have significant number of materials above 200° C. It can also be seen that there is a large number of possible material categories for the lower temperatures TES applications, while the medium and high temperatures show a significant drop-off in the number of possible types of materials. Conversely, the composite PCMs of the present invention cover storage applications within temperature ranges of from 40° C. to c.a. 200° C., which make them especially attractive for thermal energy storage applications at medium temperatures in industrial heat processes, where there is currently only a few PCM alternatives.

Therefore, a further aspect of the invention relates to the use of the composite PCM of the invention in Thermal Energy Storage applications or technologies. In a preferred embodiment, the composite PCM of the invention is used in Thermal Energy Storage, preferably in in electronics, power electronics, solar energy, batteries, buildings, waste heat recovery, air-conditioning, temperature-adaptable greenhouses and textiles. Another aspect of the invention is directed to a Thermal Energy Storage system comprising the composite PCM of the invention.

The invention is also directed to a product of manufacture, an electronic device, a solar energy system device, an energy storage device, an electronic device, a computer, a medical device, a storage unit, a building or building material, a container, an insulation or construction material, an automotive material, a vehicle, a boat, an airplane, a weapon or weapon system, industrial machinery, a pharmaceutical or a drug or a food package or storage device or container, a textile, a clothing or an apparel, footwear, a bedding or bedding system, a flame retardant material, comprising the composite PCM of the invention or the thermal energy storage system of the invention.

In a further aspect, the invention is directed to a method for thermos regulating, thermal protecting or insulating a product of manufacture, an electronic device, a solar energy system device, an energy storage device, an electronic device, a computer, a medical device, a storage unit, a building or building material, a container, an insulation or construction material, an automotive material, a vehicle, a boat, an airplane, a weapon or weapon system, industrial machinery, a pharmaceutical or a drug or a food package or storage device or container, a textile, a clothing or an apparel, footwear, a bedding or bedding system, a flame retardant material, comprising use of or incorporation of the composite PCM of the invention or of the thermal energy storage system of the invention.

The present invention provides the following further advantages:
There is no leakage of the solid-liquid PCM because the solid-liquid PCM occupies an internal volume of the solid-solid PCM;
This provides easier handling and integration into devices. Other advantages include protection from external environment, local management of volume changes, lowered flammability, and mitigation of phase separation and sedimentation problems in the case of PCMs with non-congruent melting.
The composite material is highly compact since the entirety of the enclosing or supporting material can be made purely of a solid-solid PCM;
This provides materials with higher storage capacity than known composite PCMs because the entirety of the enclosing or support material contributes to the latent heat storage. With carrier/enclosing materials (solid-solid PCMs) contributing to latent heat storage and a solid-liquid PCM loading of 60%, the novel composite PCMs can provide significantly higher storage capacity than standard composite PCMs, in which the carrier/encapsulating material has only a role of supporting material (or only part of it is PCM) and therefore does not fully participate in the storage process.
The method for the preparation of the composite PCM only requires simple steps and, by simply tuning the relative amounts of the solid-solid vs. the solid-liquid PCMs, the resulting composite material of the invention covers a wide range of temperatures, from 40° C. to 200° C.; and
Production costs.
As described in detail in the methods of the invention, and defined by the claims, the invention allows a method for the preparation of the composite PCMs of the invention that is simple and cost-effective.

Examples

In the context of the present invention, the above PCM properties, as well as further properties mentioned hereinafter, are measured according to ASTM C1784-14 (Standard Test Method for Using a Heat Flow Meter Apparatus for Measuring Thermal Storage Properties of Phase-change Materials and Products). Thermal conductivity under steady-state conditions can be measured according to ASTM E1225-13 or ASTM C518-17. Latent heat can be measured according to ASTM E793-06(2018). Neopentylglycol (NPG) and Docosane (D) were purchased at Sigma Aldrich with 99% purity and used without further purification.

Example 1. Preparation of Exemplary Composite PCMs of the Invention.

The solid-solid PCM Neopentylglycol (NPG) was chosen as supporting material. This polyalcohol (IUPAC name: 2,2-dimethylpropane-1,3-diol; Chemical formula: $C_5H_{12}O_2$) undergoes a solid-solid transition from a low temperature monoclinic structure to a high temperature homogeneous face centered cubic crystal, at 44° C.

Docosane (D) was chosen as solid-liquid PCM. This alkane (Chemical formula: $C_{22}H_{46}$) melts at 42° C.

The composite PCMs (hereinafter referred to as NPG/D materials) have been obtained by a blending process, resulting in an NPG structure enclosing Docosane.

The blending process, one of the four alternative processes of obtaining the composite PCMs of the invention, was performed following the steps of:
a) 4 grams of NPG were mechanically grinded by ball-milling method composed by 4 metallic balls of 1 gram during 15 minutes.

b) Solid powder of both NPG crystals from ball-mill and the proper amount of Docosane (related to the desired final mass fraction) were mixed and heated up to 60° C. in a hot plate with a constant stirring rate of 150 rpm during 30 min.
c) After that time, the mixture at 65° C. was discharged in a plastic mold with 9 mm of diameter and slightly pressed, avoiding the presence of air bubbles.
d) The composite was cooled down at room temperature for 24 h before its removal from the mold.
e) The final pellets were obtained by cutting the cylindrical composite each 5 mm of length.

Therefore, the following NPG/D materials were prepared:
NPG/D 40/60—Composite with 40% wt of NPG and 60% wt of Docosane
NPG/D 50/50—Composite with 50% wt of NPG and 50% wt of Docosane
NPG/D 70/30—Composite with 70% wt of NPG and 30% wt of Docosane
NPG/D 80/20—Composite with 80% wt of NPG and 20% wt of Docosane Example 2. Characterization of Exemplary Composite PCMs of the Invention.

The following experimental tests were conducted to analyze the performance of the NPG/D materials produced in Example 1:

To verify the ability that the PCM composites of the invention have in avoiding leakage of liquid Docosane at temperatures above 42° C., cylindrical samples (5 mm height, 9 mm diameter) of the NPG/D materials were placed on a heating plate and heated at 60° C. During the heating process, the samples were imaged to check for leakage and for shape-stability.

Differential scanning calorimetry (DSC) was used to determine the transition/melting temperatures, as well as corresponding latent heats, of NPG, Docosane and NPG/D materials. A power-compensation DSC Q2500 from TA Instruments was employed with closed aluminum crucibles. The mass of the samples was ca. 9 mg. Argon (50 mL/min) was employed as purge gas. Each sample was submitted to three cycles of heating and cooling from 10° C. to 80° C., with a heating/cooling rate of 5° C/min.

In addition to DSC measurements, X-ray powder diffraction measurements were carried out to investigate the solid phases of NPG, Docosane and NPG/D materials. Diffraction patterns were obtained with a D8 Discover diffractometer. The apparatus was operated in the transmission mode. A Cu-K$\alpha_{1,2}$ radiation source (wavelength 0.15419 nm) with a focusing mirror was used. Patterns were recorded at a tube voltage of 40 kV and a tube current of 40 mA applying a step size of 0.013°2θ in the angular range of 10 to 60°2θ at 40 s per step. Measurements were performed at room temperature.

Figure 1:
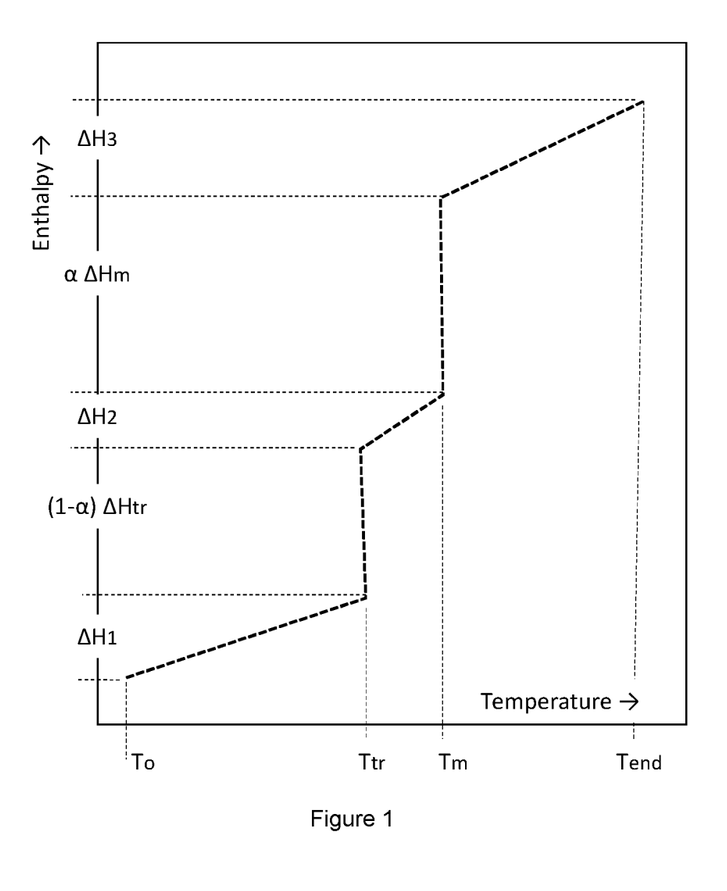
FIG. 1 shows a temperature-enthalpy schematic representation of a charging process (or discharging process in the reverse way) of the composite PCM of the invention.
Figure 2:
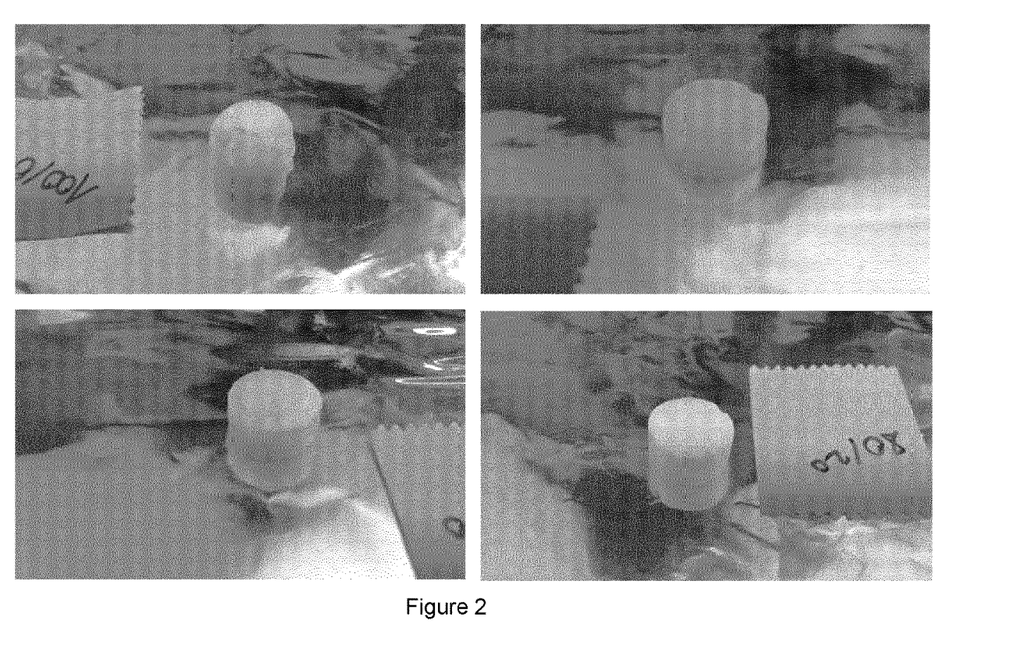
FIG. 2 shows optical images of PCM samples upon heating at 60° C. The top left image shows the solid-solid PCM Neopentylglycol (NPG) sample. The top right image shows an exemplary composite PCM of the invention prepared in example 1 (NPG/D 50/50). The bottom left image shows an exemplary composite PCM of the invention prepared in example 1 (NPG/D 70/30). The bottom right image shows an exemplary composite PCM of the invention prepared in example 1 (NPG/D 80/20).
Figure 3:
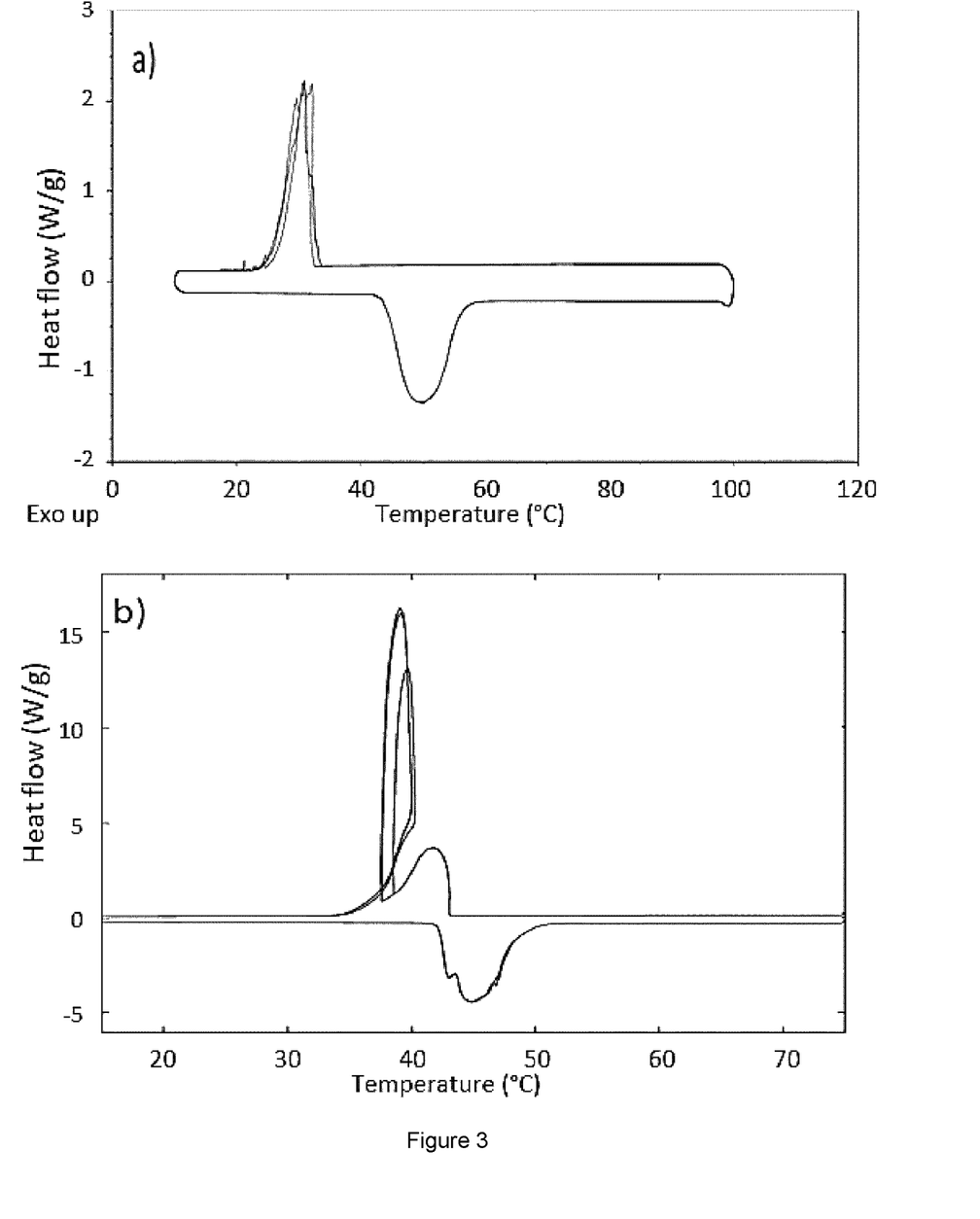
FIG. 3 shows DSC thermograms obtained for Neopentylglycol (NPG, FIG. 3a) and Docosane (D, FIG. 3b) samples.

The results can be summarized as follows:
(1) Shape-stability. FIG. 2 shows the optical imaging of the NPG sample and of the NPG/D samples heated at 60° C. The original shape of the samples did not change during heating, thus proving the shape-stabilizing ability of the solid-solid PCM. Importantly, no Docosane leaks from the composite PCM samples were observed.
(2) Latent heat storage features and performances. The DSC thermograms obtained for NPG and Docosane are displayed in FIG 3. It can be seen that the transition of NPG from monoclinic crystal structure to face centered cubic (FCC) starts at ca. 45° C. (FIG. 3a). However, the transition from FCC to monoclinic structure is delayed of ca. 11° C., appearing at 34° C. In the case of Docosane (FIG. 3b), the DSC thermogram shows two peaks both on melting and on crystallization, indicating the presence of a solid-solid transition preceding the Docosane melting at 41-42° C.

Figure 4:
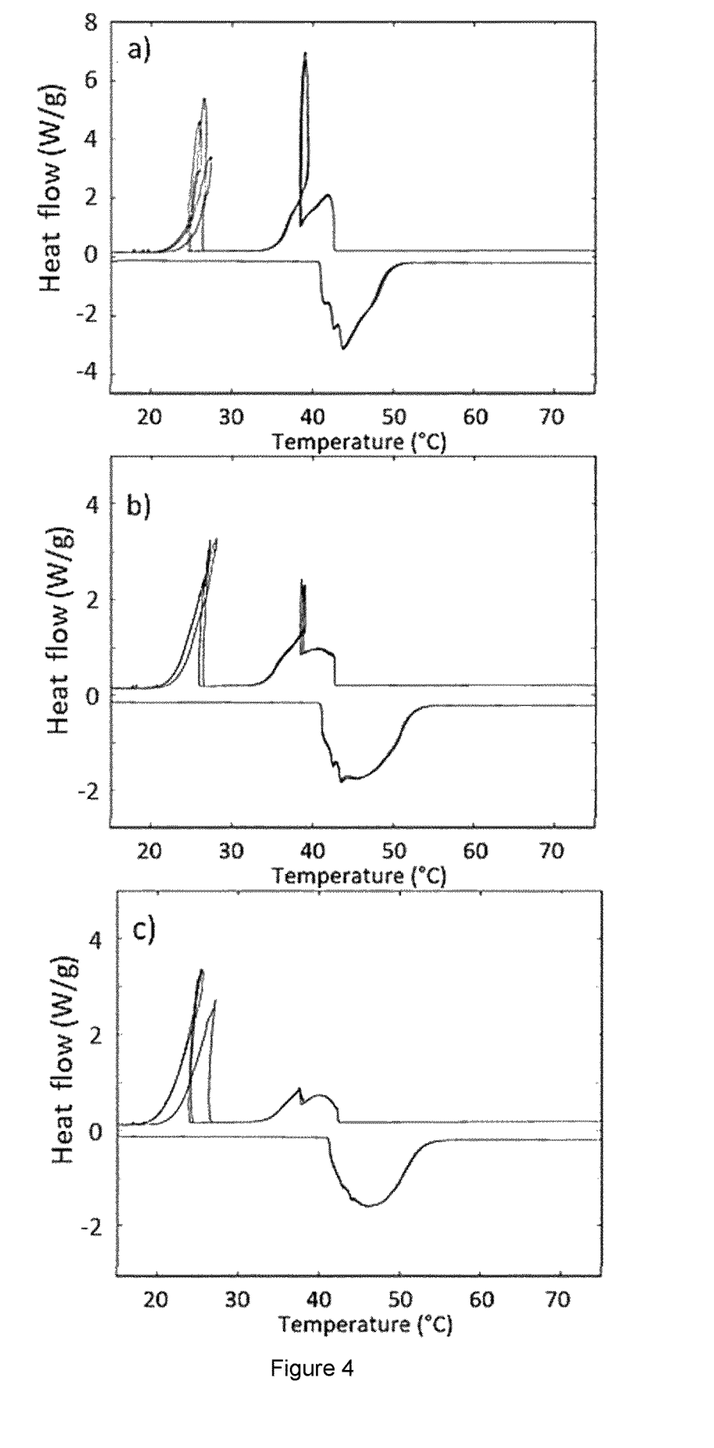
FIG. 4 shows DSC thermograms obtained for exemplary composite PCMs of the invention prepared in example 1, NPG/D 50/50 (FIG. 4a), NPG/D 70/30 (FIG. 4b) and NPG/D 80/20 (FIG. 4c).

The DSC thermograms of NPG/D materials are depicted in FIG 4, where the signatures of NPG and Docosane can be clearly appreciated:

On heating, the endothermic phenomena (negative values of heat flux) taking place within the composite materials are characterized by three overlapping peaks that appear at the same position than those observed for NPG and Docosane alone.

On cooling, the two first peaks in the thermograms correspond to the crystallization of Docosane whereas the third one (at the lowest temperature in the figures) is linked to the transition of NPG from FCC to a monoclinic crystal structure. The crystallization behavior of Docosane within the composite material does not differ from that of Docosane, whereas the "monoclinic→FCC" transition of the NPG within the composite appears at lower temperatures.

TABLE 2

DSC transition temperatures and latent heat of the PCM composite materials of the invention.

| Sample | Transition temperature (° C.)-First observed transition on heating | Enthalpy of phase transition (J/g)-All transitions included | Calculated enthalpy of phase transition (J/g) |
|---|---|---|---|
| NPG | 44.0 | 119.7 | — |
| Docosane | 42.0 | 251.1 | — |
| NPG/D 40/60 | 41.0 | 210.7 | 211.8 |
| NPG/D 50/50 | 41.0 | 190.0 | 185.4 |
| NPG/D 70/30 | 41.0 | 162.0 | 159.1 |
| NPG/D 80/20 | 41.2 | 141.9 | 146.0 |

The transition/melting temperatures and the enthalpy changes calculated from the DSC thermograms are reported in Table 2. The values of enthalpy changes were determined by integration of the phase transition peaks of the thermograms during heating. An integral tangential interpolated baseline was employed. Therefore, melting/transition enthalpies in Table 2 only account for latent heat. It must be noticed that for NPG/D materials: i) the only transition temperature reported in Table 2 is the one corresponding to Docosane melting; ii) the latent heat values reported include the latent heat of melting of Docosane and the latent heat of "monoclinic→FCC" transition of NPG, and iii) the values of latent heat in the last column have been calculated by using the rule of mixing. From these results, it can be concluded that the phase change properties of NPG and Docosane are not modified in the NPG/D materials. Retrieved transition/melting temperatures and total latent heat values are in a very good accordance with the values calculated by the rule of mixing.

In summary, it seems that there is good chemical compatibility between NPG and Docosane and that they are not miscible.

Comparing the total latent heat of the NPG/D materials with the latent heat of the solid-solid transition of NPG (see values in Table 2, third column), it follows that the heat storage capacity of NPG is increased by 75.8% by enclosing 60 wt% of Docosane within NPG. The enhancement of the NPG heat storage capacity is of 58.7%, 35.4% and 18.5% when adding, respectively, 50 wt%, 30 wt% and 20 wt% of Docosane.

It should also be taken into account that the exemplary compounds of this example have an approximate density of 1000 kg/m$^3$, which means that the materials of the present invention have a very high volumetric energy density.

Figure 5:
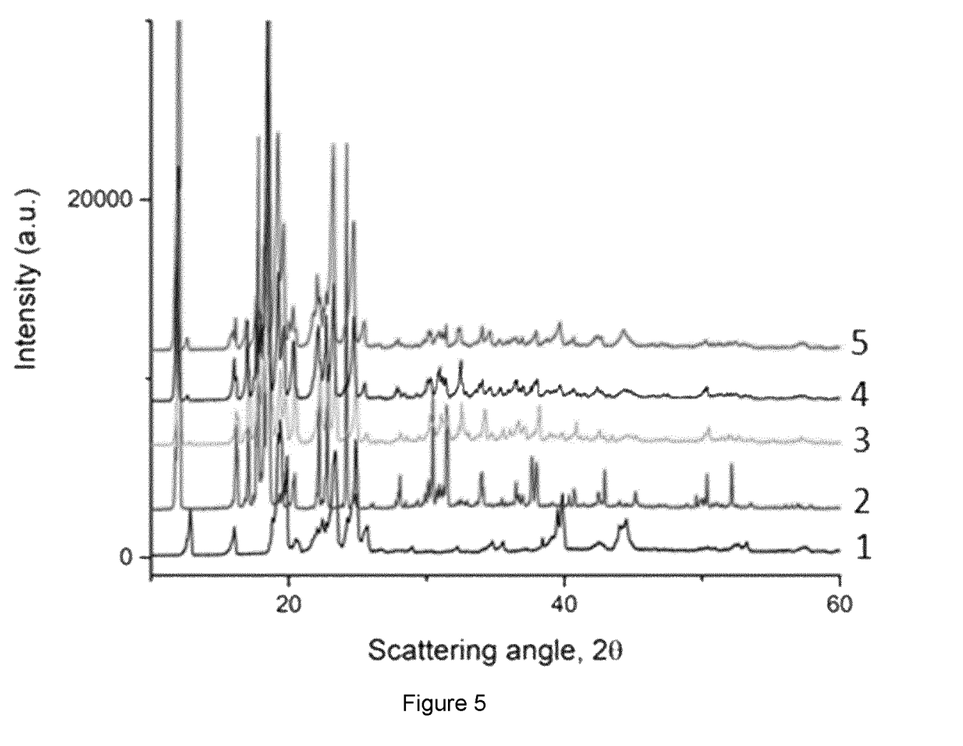
FIG. 5 shows X-ray diffraction measurements of pure components (NPG and D) and of the NPG/D exemplary composite PCMs of example 1. The identification of the curves is as follows: 1: Docosane; 2: Neopentylglycol; 3: NPG/D 80/20; 4: NPG/D 70/30; and 5: NPG/D 50/50.

(3) Solid phase of NPG/D materials analysis. The conclusions above regarding chemical compatibility and non-miscibility of NPG and Docosane are confirmed by X-ray diffraction measurements. The experimental patterns of pure components (NPG and D) and those of NPG/D materials are displayed in FIG. 5. It can be seen that the diffractogram of the NPG/D materials shows the sum of reflections present on each of the pure components. Neither new reflections nor disappearing ones are observed.

As a summary, the NPG/D PCM composite materials are exemplary embodiments that solve the problem of the invention: the provision of efficient solution for enhancing the heat capacity of a solid-solid PCM (NPG) while preserving the advantages of solid-solid PCMs (shape stability, no leakage, easy shaping and handling, etc.).

The invention claimed is:

1. A composite phase-change material (PCM) comprising:
a) a shape-stabilizer non-polymeric solid-solid phase-change material; and
b) a solid-liquid phase-change material;
wherein the non-polymeric solid-solid phase-change material encloses the solid-liquid phase-change material, and
wherein the difference between the phase-change temperature of the solid-solid PCM and the phase-change temperature of the solid-liquid PCM is less than 20° C., and
wherein the total latent heat of phase transition of the composite PCM is above 140 J/g.

2. The composite according to claim 1, wherein the non-polymeric solid-solid phase-change material has a molecular weight lower than 1500 g/mol.

3. The composite according to claim 1, wherein the difference between the phase-change temperature of the solid-solid PCM and the phase-change temperature of the solid-liquid PCM is less than 10° C.

4. The composite according to claim 3, wherein the difference between the phase-change temperature of the solid-solid PCM and the phase-change temperature of the solid-liquid PCM is less than 5° C.

5. The composite according claim 1, wherein:
the solid-solid PCM has a phase-change temperature comprised between 30 and 250° C.; and/or
the solid-liquid PCM has a phase-change temperature comprised between −30 and 200° C.

6. The composite according to claim 1, comprising at least 30% of the solid-solid phase-change material by weight percent with respect to the total weight of the solid-solid and solid-liquid phase-change materials.

7. The composite according to claim 6, comprising between 30% and 90% of the solid-solid phase-change material by weight percent with respect to the total weight of the solid-solid and solid-liquid phase-change materials.

8. The composite according to claim 1, comprising: at least 10% of the solid-liquid phase-change material by weight percent with respect to the total weight of the solid-solid and solid-liquid phase-change materials.

9. The composite according to claim 8, comprising between 10% and 70% of the solid-liquid phase-change material by weight percent with respect to the total weight of the solid-solid and solid-liquid phase-change materials.

10. The composite according to claim 1, wherein the solid-solid PCM is selected from alcohol and amine derivatives of 2,2-dimethylpropane, and mixtures thereof.

11. The composite according to claim 10, wherein the solid-solid PCM is selected from pentaerythritol, pentaglycerine, neopentylglycol, 2-amino-2-methyl-1,3-propanediol, tris (hydroxyl methyl) aminomethane, and mixtures thereof.

12. The composite according to claim 1, wherein the solid-liquid phase-change material is selected from alkanes, paraffin waxes, metal salts, polyethylene glycols, carboxylic acids, fatty acids, fatty acid esters, fatty alcohols, sugar, sugar alcohols, and mixtures thereof.

13. The composite according to claim 12, wherein the solid-liquid phase-change material is selected from tetratetracontane, docosane and mixtures thereof.

14. The composite according to claim 1, wherein:
the solid-solid phase-change material is a unary, binary or ternary mixture of solid-solid phase-change materials; and/or
the solid-liquid phase-change material is a unary, binary or ternary mixture of solid-liquid phase-change materials.

15. A method for the preparation of a composite as defined in claim 1, comprising the step of coating individual solid-liquid PCM particles or droplets with a film of the solid-solid PCM.

16. A method for the preparation of a composite as defined in claim 1, comprising the steps of:
a1) preparing a mixture comprising the solid-solid PCM and the solid-liquid PCM, heating the resulting mixture to a temperature higher than the melting point of the solid-liquid PCM and optionally pressing the resulting mixture; or
a2) preparing a mixture comprising the solid-solid PCM and the solid-liquid PCM, both in liquid state; or
a3) preparing a porous matrix of the solid-solid PCM and infiltrating or impregnating said matrix with the solid-liquid PCM in liquid phase; and
b) cooling until solidification of the mixture.

17. A thermal energy storage system comprising a composite phase-change material according to claim 1.

18. A product of manufacture, an electronic device, a solar energy system device, an energy storage device, an electronic device, a computer, a medical device, a storage unit, a building or building material, a container, an insulation or construction material, an automotive material, a vehicle, a boat, an airplane, a weapon or weapon system, industrial machinery, a pharmaceutical or a drug or a food package or storage device or container, a textile, a clothing or an apparel, footwear, a bedding or bedding system, a flame retardant material, comprising a composite phase-change material according to claim 1.

* * * * *